US010332123B2

(12) United States Patent
Alexander et al.

(10) Patent No.: US 10,332,123 B2
(45) Date of Patent: Jun. 25, 2019

(54) KNOWLEDGE BASE SEARCH AND RETRIEVAL BASED ON DOCUMENT SIMILARITY

(71) Applicant: Oracle International Corporation, Redwood Shores, CA (US)

(72) Inventors: Jeffrey H. Alexander, Arlington, MA (US); Stephen Green, Burlington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 534 days.

(21) Appl. No.: 14/837,249

(22) Filed: Aug. 27, 2015

(65) Prior Publication Data
US 2017/0060366 A1    Mar. 2, 2017

(51) Int. Cl.
*G06F 16/30*    (2019.01)
*G06Q 30/00*    (2012.01)
*G06F 11/30*    (2006.01)
*G06F 9/451*    (2018.01)
*G06F 16/332*   (2019.01)

(52) U.S. Cl.
CPC ........... *G06Q 30/016* (2013.01); *G06F 9/453* (2018.02); *G06F 11/3089* (2013.01); *G06F 16/3325* (2019.01)

(58) Field of Classification Search
CPC ...................................................... G06F 9/453
See application file for complete search history.

(56) References Cited

U.S. PATENT DOCUMENTS

| 5,813,001 | A |   | 9/1998  | Bennett |
|-----------|---|---|---------|---------|
| 6,028,601 | A | * | 2/2000  | Machiraju ........... G06F 16/3344 715/705 |
| 6,038,560 | A |   | 3/2000  | Wical |
| 6,823,325 | B1|   | 11/2004 | Davies et al. |
| 6,915,297 | B2|   | 7/2005  | Chou |
| 7,069,254 | B2|   | 6/2006  | Foulger et al. |
| 7,483,892 | B1|   | 1/2009  | Sommer et al. |
| 8,260,771 | B1| * | 9/2012  | Ortega .............. G06F 17/30997 707/723 |
| 8,417,514 | B2|   | 4/2013  | Brown et al. |
| 9,213,748 | B1| * | 12/2015 | Matias .............. G06F 17/30864 |

(Continued)

OTHER PUBLICATIONS

Helpjuice, "Get fewer support emails & more happy customers", Knowledge Base, last downloaded Feb. 3, 2015, Knowledge base software, https://helpjuice.com/.

(Continued)

*Primary Examiner* — Mahesh H Dwivedi
(74) *Attorney, Agent, or Firm* — Potomac Law Group, PLLC

(57) ABSTRACT

A system performs search and retrieval. The system monitors one or more user interface ("UI") fields configured to receive text input in a UI. The system determines that the one or more UI fields are being used to enter a textual description, and performs a search on a knowledge base based on document similarity to identify documents that are similar to a portion of the textual description that has already been entered in the one or more UI fields. The system then provides one or more of the documents in a UI field of the UI, and repeats the monitoring, the determining, the performing, and the providing.

18 Claims, 5 Drawing Sheets

(56) References Cited

U.S. PATENT DOCUMENTS

| | | | | |
|---|---|---|---|---|
| 9,679,027 | B1* | 6/2017 | Matias | G06F 17/30554 |
| 9,699,129 | B1* | 7/2017 | Nelken | H04L 51/26 |
| 2006/0004711 | A1* | 1/2006 | Naam | G06F 17/30867 |
| 2007/0288444 | A1* | 12/2007 | Nelken | G06F 17/30864 |
| 2008/0005118 | A1* | 1/2008 | Shakib | G06F 17/30864 |
| 2008/0228504 | A1 | 9/2008 | Nguyen et al. | |
| 2011/0082878 | A1* | 4/2011 | Nozaki | G06F 16/3338 707/769 |
| 2012/0159349 | A1* | 6/2012 | Kansky | H04L 51/046 715/752 |
| 2012/0191716 | A1* | 7/2012 | Omoigui | H01L 27/1463 707/740 |
| 2012/0303614 | A1* | 11/2012 | Mercuri | G06Q 10/101 707/723 |
| 2013/0024440 | A1* | 1/2013 | Dimassimo | G06F 17/30864 707/709 |
| 2013/0185099 | A1* | 7/2013 | Bucur | G06F 19/325 705/3 |
| 2013/0223600 | A1* | 8/2013 | Sharp | H04M 3/00 379/88.01 |
| 2015/0186474 | A1* | 7/2015 | Angel | G06F 16/90335 707/723 |
| 2015/0199436 | A1* | 7/2015 | Bailey | G06F 16/9535 707/708 |
| 2015/0242536 | A1* | 8/2015 | Surkov | G06F 17/30864 707/706 |
| 2016/0314131 | A1* | 10/2016 | Leicht | G06F 16/3322 |
| 2016/0335261 | A1* | 11/2016 | Salvetti | G06F 16/2455 |
| 2017/0060366 | A1* | 3/2017 | Alexander | G06F 3/0484 |
| 2017/0235848 | A1* | 8/2017 | Van Dusen | G06F 17/30979 705/12 |

OTHER PUBLICATIONS

HappyFox, "Knowledge Base Software. Build Help & FAQ pages", last downloaded Feb. 3, 2015, https://www.happyfox.com/knowledge-base/.

Knowledge Base Manager Pro v5.2, "What's New in Knowledge Base Manager Pro v5.2?", last downloaded Feb. 3, 2015, http://www.web-site-scripts.com/knowledge-management/whats-new-in-knowledge-base-manager-pro-v5-2.html.

ManageEngine, Knowledge Base—Collective knowledge fused together for instant reference, last downloaded Feb. 3, 2015, http://www.manageengine.com/products/service-desk/knowledge-base.html?index.

Logix, "Cloud Email Archival", last downloaded Feb. 3, 2015, http://www.logix.in/wp-content/uploads/2015/01/Cloud-Email-Archival.pdf.

Waterford Technologies, "MailMeter Archive", last downloaded Feb. 3, 2015, http://www.waterfordtechnologies.com/wp-content/uploads/2013/12/MailMeter-Archive.pdf.

Zendesk Support, "Use topic suggestions to increase ticket deflection", last downloaded Aug. 27, 2015, https://support.zendesk.com/hc/en-us/articles/203860418-Use-topic-suggestions-to-increase-ticket-deflection.

* cited by examiner

KNOWLEDGE BASE SEARCH AND RETRIEVAL BASED ON DOCUMENT SIMILARITY

FIELD

One embodiment is directed generally to a search and retrieval system, and in particular, to a knowledge base search and retrieval system.

BACKGROUND INFORMATION

In general, search and retrieval systems allow a user to locate specific information from a repository of documents. Typically, a search and retrieval system performs indexing by parsing the repository of documents. Thereafter, when a user enters a "search string" or "search query" consisting of one or more words or terms, the system consults the index to locate a match by comparing the words of the query to words of the documents in the repository.

One application of search and retrieval systems is in providing customer support (or technical support) to assist customers in using a service or product. For example, a customer support system may incorporate search and retrieval functionality that relies on a knowledge base of known issues and corresponding resolutions. Customer support may be provided via various channels of communication such as phone, live chat, email, social media, etc. For example, when immediate help is not required, a customer may send a corresponding email message or request help via a Web-based customer support form.

SUMMARY

One embodiment is a system that performs search and retrieval. The system monitors one or more user interface ("UI") fields configured to receive text input in a UI. The system determines that the one or more UI fields are being used to enter a textual description, and performs a search on a knowledge base based on document similarity to identify documents that are similar to a portion of the textual description that has already been entered in the one or more UI fields. The system then provides one or more of the documents in a UI field of the UI, and repeats the monitoring, the determining, the performing, and the providing

DETAILED DESCRIPTION

One embodiment provides search and retrieval functionality based on document similarity. In one embodiment, while the description of an issue is being typed or otherwise inputted by a user seeking customer support, the entirety of such description is queried as opposed to only a number of selected keywords in the description, and documents that provide solutions to the issue are displayed alongside the description of the issue as it is being typed. In one embodiment, as the user adds words to the description, a "query document" is constructed and a search engine is reached to find documents with a high degree of similarity to the given query document. In one embodiment, more accurate results are provided to the user as more text is entered. Accordingly, embodiments provide cost savings by obviating the need for having a support personnel or a product engineer address every customer support issue. Further, by providing customer support solutions more quickly and accurately, embodiments improve the overall user experience.

Figure 1:
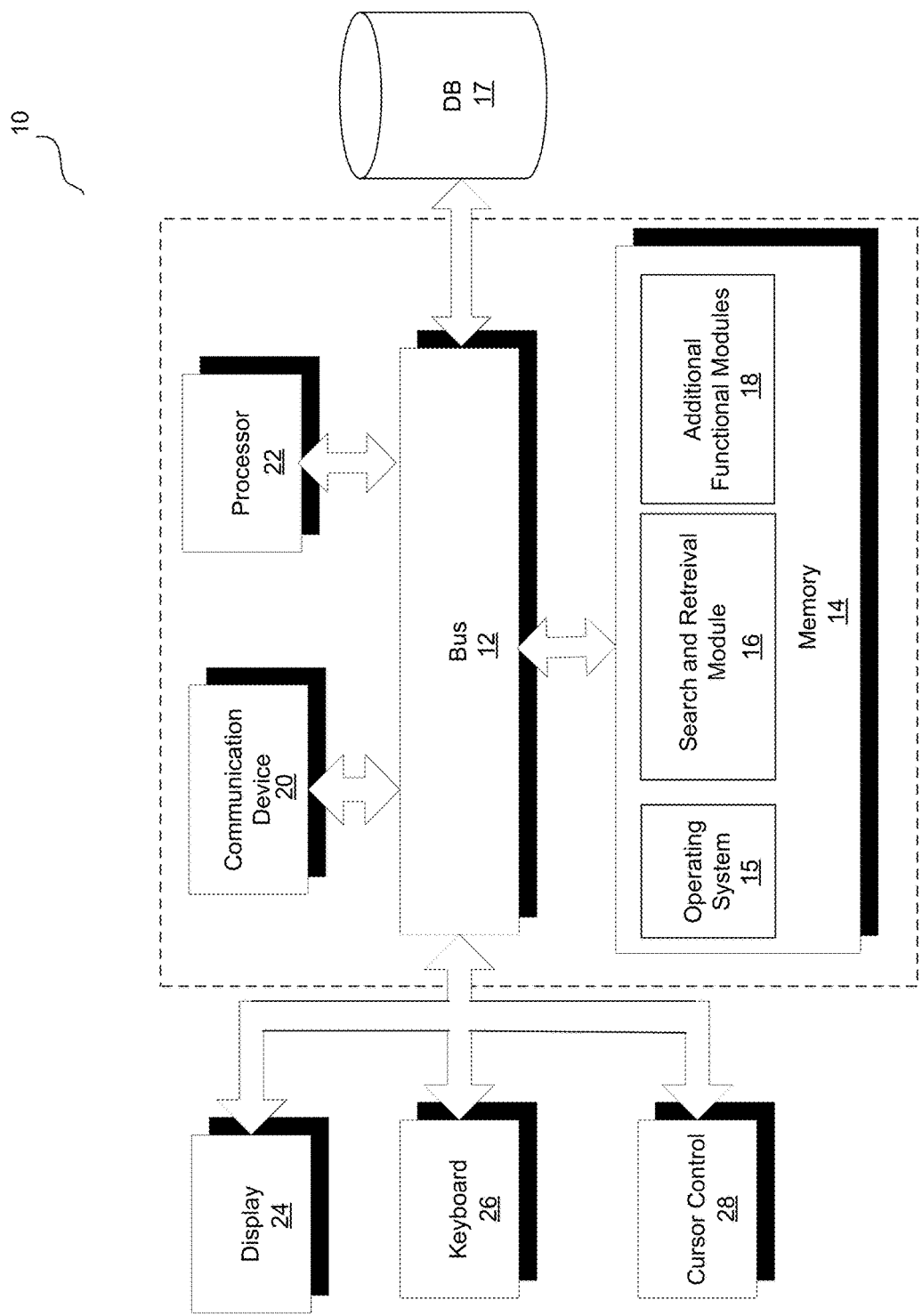
FIG. 1 is a block diagram of a computer server/system in accordance with an embodiment of the present invention.

FIG. 1 is a block diagram of a computer server/system (i.e., system 10) in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. For example, for the functionality of a customer support system, system 10 may be a server that in general has no need for a display 24 or one or more other components shown in FIG. 1.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable medium. System 10 further includes a communication device 20, such as a network interface card, to provide access to a network. Therefore, a user may interface with system 10 directly, or remotely through a network, or any other method.

Computer readable medium may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a search and retrieval module 16 for providing search and retrieval functionality, and all other functionality disclosed herein. Therefore, system 10 can include one or more additional functional modules 18 to include the additional functionality. A database 17 is coupled to bus 12 to provide centralized storage for search and retrieval module 16 and additional functional modules 18.

Figure 5:
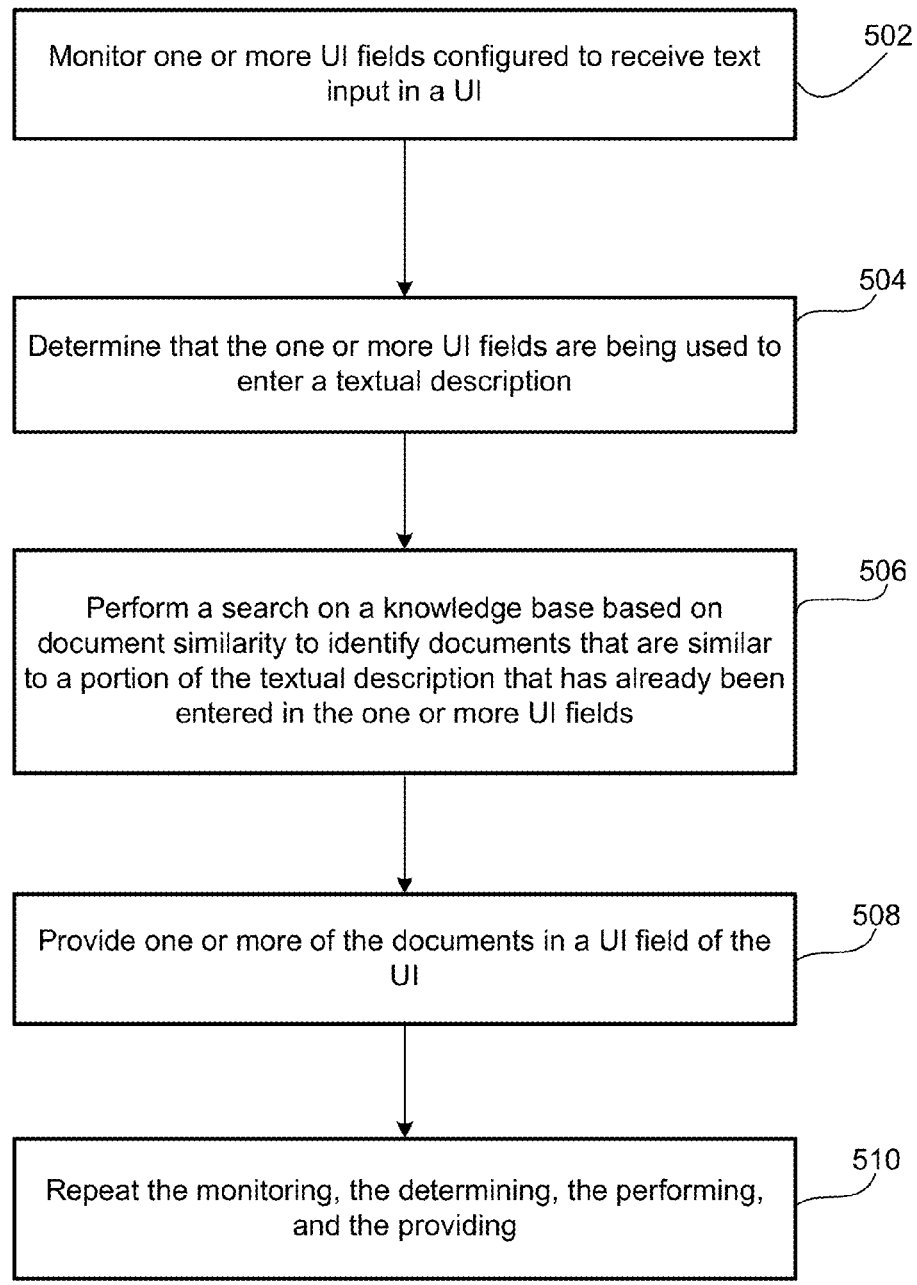
FIG. 5 is a flow diagram of the operation of the search and retrieval module of FIG. 1 when performing search and retrieval in accordance with embodiments of the present invention.

In one embodiment, search and retrieval module 16 and/or additional functional modules 18 may include a module that monitors one or more UI fields configured to receive text input in a UI, a module that determines that the one or more UI fields are being used to enter a textual description, a module that performs a search on a knowledge base based on document similarity to identify documents that are similar to a portion of the textual description that has already been entered in the one or more UI fields, a module that provides one or more of the documents in a UI field of the UI, and a module that repeats the monitoring, the determining, the performing, and the providing, as will be described herein with reference to FIG. 5.

Generally, with known systems, when a user needs help with using a product or service, he/she may try to find an answer by contacting a support agent or by performing a search over a knowledge base corresponding to the product or service. For example, the user may formulate a query that includes certain keywords (e.g., typically a combination of 2 or 3 keywords) and run a query on a knowledge base. Subsequently, if no useful results are returned by the query, the user may fill out an email/Web form and submit it via a Web application so that a support agent or an automated system can carry out a supplemental search. A support agent that receives a request for help with an issue may also need to contact a higher-level support personnel or a product engineer. However, submitting a question to higher-level support personnel or product engineers requires allocation of additional time and money while the question may have already been answered by existing entries in a corresponding knowledge base.

In some known systems, when an end user writes and submits a full description of an issue in a Web form, the user is redirected to an interstitial page that suggests viewing a number of knowledge base entries before the issue can be fully submitted. The knowledge base articles that are displayed in the interstitial page may be chosen by selecting a set of keywords out of the subject and body of the end user message and using those keywords to search the knowledge base and return a set of answers. Accordingly, if a correct answer is provided within the returned set, the user may not further proceed to submit the issue. These known systems provide the interstitial page to potentially reduce the number of cases that are directed to higher level support agents and product engineers, thereby reducing the overall customer support costs. However, the interstitial pages are usually ineffective in resolving the user issue and may also be annoying to the user. The percentage of questions that are redirected and successfully resolved before being fully submitted to higher level support agents and product engineers is referred to as the "deflection rate."

Some known systems take the description of an issue as entered by a user in a Web form, select out keywords from the subject and body of the entered description, and assign hand-tuned weights (e.g., via a UI presented to a user to let them specify the weights in various fields) to the keywords based on where they appear in the description (e.g., words in the subject line of the description are given a higher weight). Then, the keywords and their associated weights are submitted as a query to a search engine to return the best matching documents in the knowledge base. For example, some known systems select sets of keywords from the subject and body of an end user email and then use a search engine to run searches on each of these sets of selected keywords (e.g., different sets corresponding to different fields when the user can choose keywords differently in the subject verses the body), compute a linear combination of the scores per answer, and return a number of the top matching answers to be displayed in an interstitial page before the description is finally submitted.

However, if the keywords are selected poorly, the search engine may not return useful/relevant results. For example, some known systems return the top 6 matching answers with the goal of achieving a deflection rate of 20%, while the actual deflection rate achieved is 4-5% and with an accuracy of 26%, where accuracy is the proportion of test queries for which there is a correct answer in the top 6 answers.

In contrast to the known systems, embodiments of the present invention provide customer support by performing document search and retrieval based on document similarity where an entire document is queried as opposed to only a number of selected keywords in the document. Further, in one embodiment, the interstitial page is removed and documents that provide solutions to an end user issue are displayed alongside the description of the issue as the description is being typed by the user (e.g., in an area on the right or below the user interface ("UI") field where the user enters the description of the issue). In one embodiment, the more text the user provides, the more the accuracy of the displayed knowledge base documents will be. Additionally, since the user can see the results updating as he/she provides more text, the user can better focus on a potential solution while typing further.

Figure 2:
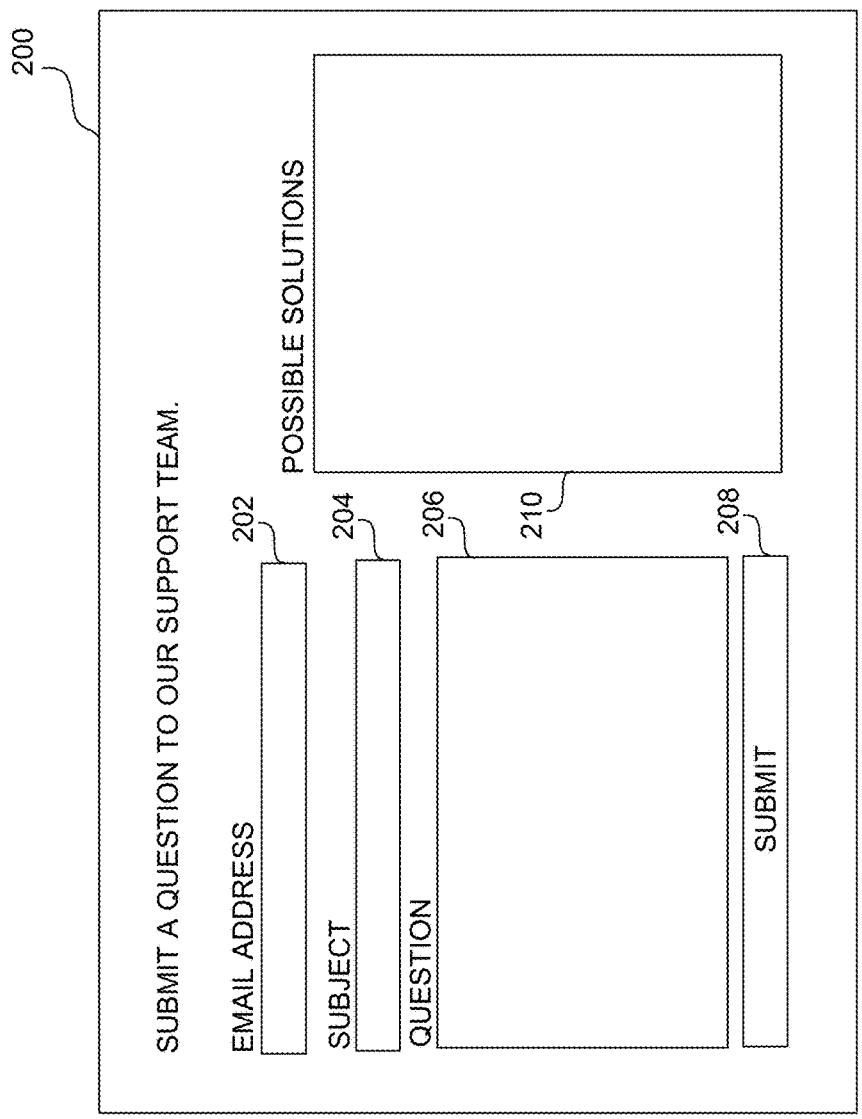
FIG. 2 is an example user interface ("UI") of a search and retrieval system in accordance with embodiments of the present invention.

FIG. 2 is an example UI 200 of a search and retrieval system in accordance with embodiments of the present invention. UI 200 includes various fields for a user to enter text and request customer support on an issue. For example, a user may provide his/her contact information by entering an email address in an email address field 202 of UI 200. Alternatively or additionally, the user may enter other contact information, such as phone, username, etc., in respective alternative fields (not shown). UI 200 also includes a subject field 204 where the user can enter the subject of the customer support request, and a question field 206 where the user can more fully describe the issue on which customer support is needed. When the description of the issue is entered to the satisfaction of the user, he/she may press a submit button 208 to submit the request so the search and retrieval system can perform a search on a knowledge base and find appropriate responses to the user issue. According to this embodiment, while the user is typing in subject field 204 and question field 206 of UI 200, the search and retrieval system performs search and retrieval on the knowledge base based on document similarity between the existing documents in the knowledge base and the text entered by the user thus far, and provides a number of the best matching responses to the user in a possible solutions field 210 of UI 200. In FIG. 2, possible solutions field 210 is provided on the right side of UI 200. However, in alternative or additional embodiments, possible solutions field 210 may be provided in another area of UI 200, e.g., at the top, bottom, etc.

In some embodiments, no distinction is made between the subject and the body of the submitted question, and all words are assigned weights automatically based on their importance in the knowledge base. In one embodiment, as words are added to the description by the user, a query document is constructed that includes all words entered by the user thus far, and a search engine is reached to find knowledge base documents with a high degree of similarity to the given query document.

In one embodiment, the deflection rate is improved/increased since using the full text that a user enters improves the accuracy of the knowledge base search. Further, the early displaying of search results may cause the user to save time and avoid unnecessary typing. One embodiment starts showing potential solutions to users after they have entered only a few words (e.g., 10 words), thus significantly improving the user experience. Additionally, early display of a small set of potential solutions for the user to examine may provide performance improvement since such results are shown in-context as the user types, rather than on an interstitial page after the user is finished typing. In one embodiment, since document similarity functionality is implemented to improve search result accuracy, a correct solution is more likely to be found and ranked close to the top of the search result list, thus eliminating the need to show many results (e.g., more than two results) and providing a much smaller amount of data to be processed by the user, hence further enhancing user experience.

Generally, search engines are configured for answering short queries (e.g., 1-3 word queries) on a corpus of Web documents. For example, Google truncates queries that are longer than about 10 words. Additionally, search engines such as Google implement a ranking function (i.e., a function that determines in what order the hits will be displayed) that makes extensive use of the link structure of the Web (i.e., which pages link to which others) as well as the internal structure of the page (i.e., which sections are headers, which are anchor text, etc.). As such, when used for searching a document set that does not have link structure or much internal structure (e.g., a collection of customer support documents in a knowledge base, such as "My Oracle Support" from Oracle Corp.), these search and retrieval models may fail. However, some embodiments of the present invention provide search and retrieval functionality that is configured for longer queries (e.g., dozens or hundreds of words) and does not depend on any link structure between the knowledge base documents or the internal structure of a page.

Additionally, search engines such as Google are only effective when they have a large number of documents available (e.g., a document collection of tens to hundreds of millions of documents) to build a satisfactory ranking model. However, some embodiments of the present invention can be used with knowledge bases as small as a few hundred documents where Web ranking models provide no leverage. Further, while search engines such as Google provide value for short queries against data that is publicly available on the Web, they cannot provide any access to data that is not publicly available. For example, the knowledge base of My Oracle Support from Oracle Corp. is only available to customers logged into the Oracle support Website, hence preventing Google and other Web search engines to provide hits against it. However, some embodiments of the present invention can be used against knowledge bases that are not exposed to the Web.

In one embodiment, when the user has exhausted his/her available search options (e.g., has used a search engine (e.g., Google) to search for an answer, has tried an engine available from the knowledge base that is being searched, has browsed for an answer in the popular answers section, etc.), the user starts composing text in a Web form to more fully describe his/her problem. This embodiment then takes advantage of such larger textual description of the user issue and runs queries in the background to try to solve the underlying problem that is the subject of the customer support request of the user.

One embodiment utilizes a search engine in which documents are represented as vectors in an N dimensional term space. In this embodiment, knowledge base documents are indexed into the search engine and the search engine is configured to store document vector(s) for each document.

In one embodiment, there are multiple vectors stored per document to allow for computing the similarity of various portions of the document (e.g., computing the similarity between titles alone). For example, one embodiment may store one vector for each field of interest and also a vector that incorporates all of these fields. Depending on the type of data in the knowledge base, the search engine may also be configured to transform the documents into a suitable representation. For example, in each document, the search engine may stem terms, eliminate stop words, downcase all text, etc.

One embodiment answers queries by accessing a Web service via a representational state transfer ("REST") protocol to open a search engine and handle queries submitted in the form of a list of terms. REST is a software architecture style that includes guidelines and best practices for creating scalable Web services, as provided, for example, by Internet engineering task force ("IETF") request for comments ("RFC") 7231. This embodiment uses an application programming interface ("API") provided by the search engine to construct a query in the form of a new document vector that represents the list of terms. Then, using the same API, the search engine is instructed to find documents that are most similar to the document represented in the query.

One embodiment implements the asynchronous JavaScript and extensible markup language ("AJAX") on the client side to monitor the text areas/fields used by the user for entering customer service issue descriptions. Once a certain minimum number of terms are entered, corresponding requests containing the terms in the fields are sent to a server and the results of corresponding queries are displayed beside or below the text area/field. Such results may include a small snippet of text from the beginning and/or a passage from within the document that includes an optimal arrangement of the terms provided in the query.

In one alternative or additional embodiment, the client is implemented as a plugin for an email client (e.g., a stand-alone or a Web based email client), and the knowledge base includes an archive of previous email messages from email clients. When a user of an email client begins to type a message, queries are submitted to a Web service that includes the search engine which was used to index the documents in the knowledge base. In one embodiment, in addition to the terms in the email, the name of the mailing list to which the message is being sent is also included as a parameter to the query. The Web service then searches either the entire archive or the archive of just the specific mailing list to which the email is addressed, and previous messages that potentially include answers to the questions being asked in the email message are presented next to or below the text area where the email is being typed.

Embodiments are applicable to any system that includes a knowledge base and a corresponding environment in which users request answers to their questions, such as online end-user support Websites, product technical support systems for enterprises, etc. Embodiments are applicable to any search that is based on a reasonably large text against any given set of documents, and can be easily scaled to a large number of documents. Embodiments are also applicable for finding near-duplicate documents, performing relevance feedback in searches for larger knowledge bases, etc.

One embodiment includes a customer support knowledge base with a set of customer support answers and a set of customer support question with known answers within the set of customer support answers. In order to support document similarity functionality, this embodiment indexes the available customer support answers into a search engine that provides document similarity functionality, such as "Minion." Minion is a product quality search engine written in Java and created by Oracle Labs. Minion provides an API for indexing and searching documents based on document similarity measures. Then, for a given question, a question document is generated from the subject and body of the question. For example, one embodiment generates a question document by parsing out hypertext markup language ("HTML"), folding case (i.e., reducing all letters to lower case), removing stop words, stemming the words (i.e., reducing the words into their roots by removing inflectional affixes), etc., while keeping count of each remaining word. Then, answers that are similar to the question document are found in the knowledge base.

In one embodiment, the mean reciprocal rank ("MRR," a measure for evaluating a process that produces a list of possible responses to a sample of queries) is measured by computing 1/rank of the first correct answer for each question and averaging over all questions. For example, for a knowledge base of 2300 answers and an evaluation set of 678 queries, one embodiment that returns the top 6 matching answers results in an MRR of 0.348 with an "accuracy" of 46.6% (316/678), where "accuracy" is the ratio between the number of queries for which a correct answer is identified in the top 6 suggested answers and the total number of attempted queries. In this embodiment, the MRR for questions where a satisfactory answer is found is 0.746, and when a correct answer is found, it is either the first or the second returned answer. Accordingly, this embodiment results in accuracies similar to those provided by "MoreLikeThis" from Lucene.

Figure 3:
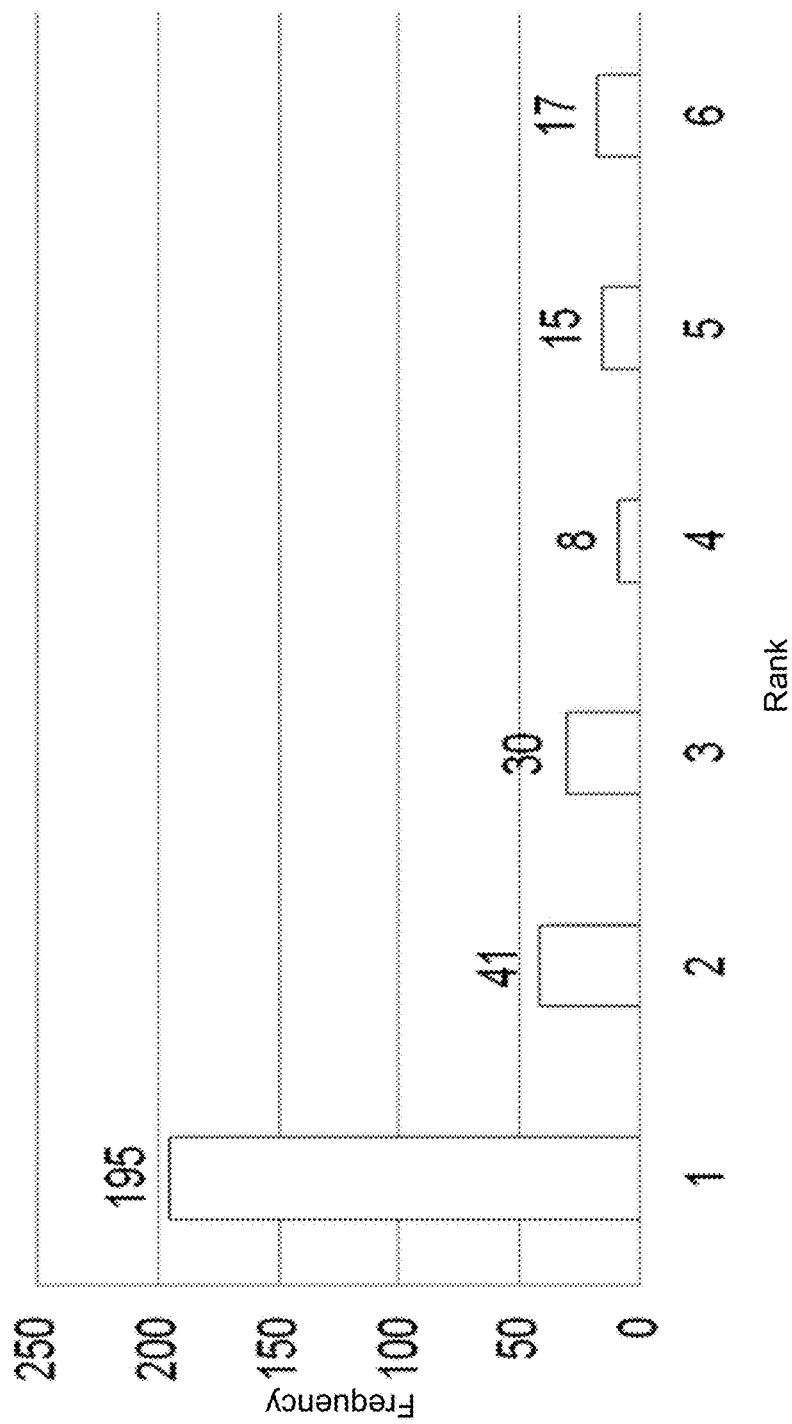
FIG. 3 is an example rank distribution of the first correct answer returned in embodiments of the present invention.

FIG. 3 provides a histogram of the ranks at which a correct answers is found in the aforementioned data set by this embodiment that returns the top 6 matching answers. In FIG. 3, the horizontal axis corresponds to the rank of the identified correct answer in the top 6 suggested answers (with possible values of 1 through 6), and the vertical axis corresponds to the frequency (e.g., total number) of queries for which a correct answer of such rank was identified. For example, the embodiment identifies a rank 1 correct answer 195 times, a rank 2 correct answer 41 times, etc. Accordingly, the most frequent result of this embodiment is that the very first returned answer (i.e., rank 1) is a satisfactory answer.

Figure 4:
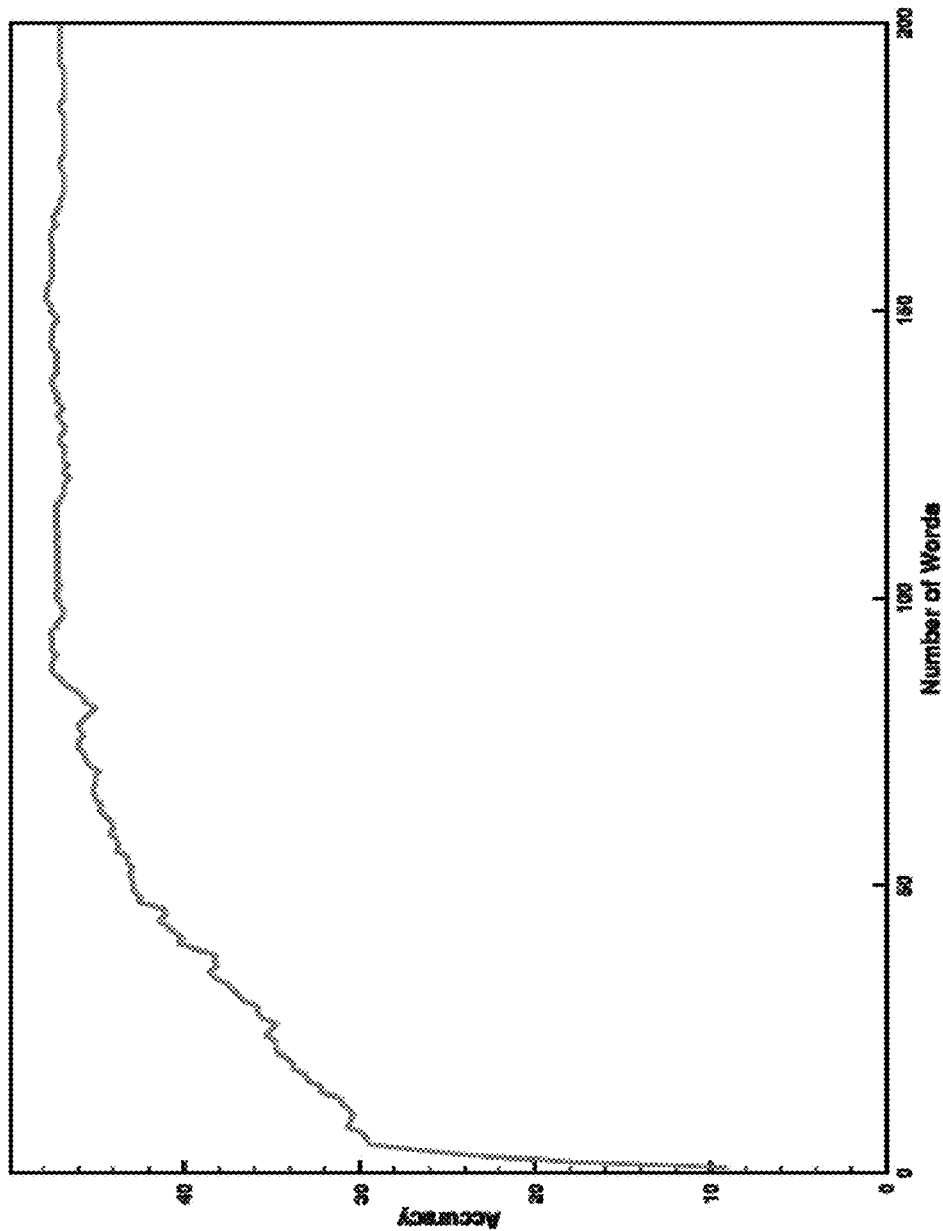
FIG. 4 is an example of accuracy as a function of the number of words already input by a user as the user is typing/inputting a description of a customer support issue, in accordance with embodiments of the present invention.

FIG. 4 provides an example of accuracy as a function of the number of words already input by a user as the user is typing/inputting a description of a customer support issue, in accordance with an embodiment of the present invention. As illustrated in FIG. 4, in this embodiment, accuracies exceeding those obtained by known systems are achieved after as few as 10 words are entered by the user. Further, accuracies exceeding 42% are achieved when more than 50 words are entered, and accuracies exceeding 46% are achieved when more than 100 words are entered.

One embodiment performs word by word similarity to identify answers as the user types a question. In one embodiment, a question and a corresponding answer may not share any words in common. For example, the answer to the question "I am getting duplicate entries in some menus" may be "In order to clear your cache . . . ." A customer support agent that identifies this answer as appropriate knows that clearing the cache will resolve the customer problem, although there is no terminology overlap between the question and the answer. As such, this embodiment implements a question similarity functionality so that if a question does not match any answers, perhaps it may match one or more of the previous questions with known answers. This embodiment indexes previous questions with known answers and then uses question to question similarity to find answers for a new question. In this embodiment, better question coverage in the knowledge base results in better answers being provided since there is a larger set of implicit correct answers derived from previous searches. One embodiment first performs document similarity functionality between a question and the available answers in a knowledge base. Then, if no high enough score is found, this embodiment implements document similarity between the question and previous questions with known answers as stored in the knowledge base.

One embodiment uses an inverted index (also known as a "postings file" or an "inverted file") data structure. An inverted index is an index data structure storing a mapping from content (such as words or numbers) to corresponding locations in a database file, document, or set of documents. An inverted index allows for fast full text searches when a document is added to a database, and is commonly used in document retrieval systems such as search engines.

One embodiment uses a vector space model ("VSM," also known as the term "vector model"). Generally, VSM information retrieval ("IR") systems represent a document as a vector in a very high dimensional space where the number of dimensions is the number of unique words in the corpus of documents that has been indexed. In a large document collection such as a knowledge base, the number of dimensions may be in the tens of thousands. This embodiment associates weights with each dimension. The weights may be calculated using a weighting function such as the "term frequency inverse document frequency" ("Tf-idf") weighting. Tf-idf is configured to reflect how important a word is to a document in a collection or corpus. A Tf-idf weight associated with a word increases proportionally to the number of times the word appears in a document, but is offset by the frequency of the word in the corpus to adjust for words that generally appear more frequently. In one embodiment, the vectors are normalized to unit length in order to account for variation in document length. In VSM, document similarity is measured by the cosine of the angle between two document vectors. Accordingly, angles near 0 (i.e., for documents whose vectors are very close together) result in similarity values near 1. One embodiment implements a VSM IR system where queries are considered to be documents as well, and finds the best matching documents for a given query by finding the document vectors that are closest to the query vector. In one embodiment, the documents represented in the VSM IR system are the answers in the customer support knowledge base and the query documents are user emails describing their issues.

In one embodiment, in order to find target documents that are most similar to a given query document, if the query document is not already represented in the vector space (e.g., the query document is a query or a document provided by a user), then the query document is turned into a vector in the same space as the target documents. Generally, this is performed by running the query document through the same indexing process used to generate the search index over the target documents. Once the query document is provided as a vector, the matching process initialize a set of accumulators configured to accumulate scores associated with respective target documents. Then, for each term "t" in the query document, the embodiment looks for "t" in the inverted index as obtained based in the knowledge base. If "t" does not occur in the index, the embodiment moves on to the next term in the query document. If "t" is found in the index, its associated postings are read, and for each posting in the list associated with "t," the embodiment computes the weight of "t" in the current target document using Tf-idf, and adds the Tf-idf weight to the score in the accumulator for the current target document. Then, the embodiment selects the top n accumulators from the set of accumulators, and returns the target documents represented by the top n accumulators.

FIG. 5 is a flow diagram of search and retrieval module 16 of FIG. 1 when performing search and retrieval in accordance with embodiments of the present invention. In one embodiment, the functionality of the flow diagram of FIG. 5 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 502, search and retrieval module 16 monitors one or more UI fields configured to receive text input in a UI, and at 504, search and retrieval module 16 determines that the one or more UI fields are being used to enter a textual description. The one or more UI fields may include one or more of a mailing list field, a subject field, and a description field.

At 506, search and retrieval module 16 performs a search on a knowledge base based on document similarity to identify documents that are similar to a portion of the textual description that has already been entered in the one or more UI fields. In one embodiment, the search is performed only on a portion of the knowledge base that corresponds to the mailing list. In one embodiment, the search is performed by constructing a query document that includes all words (i.e., each and every word) in a subject entered in the subject field and a description entered in the description field. In one embodiment, the documents are identified based on document similarity between the query document and the documents.

In one embodiment, the knowledge base corresponds to a customer support system and includes customer support questions and customer support answers. In one embodiment, the search is performed on the knowledge base based on document similarity to identify a subset of the customer support answers that are similar to the query document. In one embodiment, if the subset of the customer support answers does not include a customer support answer whose document similarity with the query document is greater than a threshold, the search is further performed on the knowledge base based on document similarity to identify a subset of the customer support questions that are similar to the query document.

In one embodiment, if the subset of the customer support answers does not include a customer support answer whose document similarity with the query document is greater than a threshold, the search is further performed on the knowledge base based on document similarity to identify a subset of the customer support questions that are similar to the subject entered in the subject field. In this embodiment, the documents that are provided in the UI field include one or more previously identified answers to the subset of the customer support questions.

At 508, search and retrieval module 16 provides one or more of the documents in a UI field of the UI, and at 510, search and retrieval module 16 repeats the monitoring, the determining, the performing, and the providing.

As disclosed, embodiments allow for a Solve-As-You-Type solution that implements document similarity functionality to perform knowledge base searches while a user enters a customer support question. One embodiment locates articles that best answer the user question before the question is fully submitted. For Web based support, embodiments can effectively deflect users from submitting tickets, thereby saving time and money. Accordingly, embodiments give the end user the possibility of obtaining faster and more accurate customer support, while at the same time reducing the resource used by a customer support system to accommodate the end user, thus improving the functionality of the computer that provides the search results.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to perform search and retrieval, the search and retrieval comprising:
   monitoring one or more user interface (UI) fields configured to receive text input in a UI;
   determining that the one or more UI fields are being used to input a textual description;
   performing, after an amount of textual description greater than a threshold has been input, a search on a knowledge base comprising a first set of documents and a second set of documents based on a term frequency inverse document frequency similarity metric to identify documents from the second set that are similar to a portion of the textual description that has been input, wherein documents of the first set comprise predetermined links to documents of the second set;
   displaying one or more of the second set of documents that are identified as being similar to the textual description based on the search in a UI field of the UI; and
   performing, after additional textual description has been input, a refined search on the knowledge base to identify documents that are similar to the textual description that has been input based on the document similarity metric, wherein
   the displaying is updated to display one or more documents identified as being similar to the textual description based on the refined search,
   the first set of documents correspond to support questions, and the second set of documents correspond to support answers, the support questions having predetermined support answers, and
   when a subset of the support answers does not include a support answer whose document similarity with the textual description according to the document similarity metric is greater than a threshold, the refined search is further performed on the knowledge base based on document similarity according to the document similarity metric to identify a subset of the support questions that are similar to the textual description.

2. The computer readable medium of claim 1, wherein the one or more UI fields include one or more of a mailing list field, a subject field, and a description field.

3. The computer readable medium of claim 2, wherein the search is performed by constructing a query document that includes all words in a subject input in the subject field and a description input in the description field.

4. The computer readable medium of claim 3, wherein the documents are identified based on the document similarity metric determined for the query document relative to the documents of the knowledge base.

5. The computer readable medium of claim 3, wherein the knowledge base corresponds to a customer support system.

6. The computer readable medium of claim 5, wherein the search is performed on the second set of documents based on the document similarity metric to identify a subset of the support answers that are similar to the query document.

7. The computer readable medium of claim 6,
wherein, when the subset of the support answers does not include a support answer whose document similarity with the query document according to the document similarity metric is greater than a threshold, the refined search is further performed on the knowledge base based on document similarity according to the document similarity metric to identify a subset of the support questions that are similar to the subject input in the subject field;
wherein the one or more of the documents that are displayed in the UI field comprise one or more previously identified answers to the subset of the support questions.

8. The computer readable medium of claim 5, wherein, for a given term of the query document and a given document in the second set of documents of the knowledge base, the similarity metric increases proportionally to a number of times the given term appears in the given document and is offset by an overall frequency of the given term in documents of the second set of documents.

9. A method of search and retrieval, comprising:
monitoring, by a processor, one or more user interface (UI) fields configured to receive text input in a UI;
determining that the one or more UI fields are being used to input a textual description;
performing, after an amount of textual description greater than a threshold has been input, a search on a knowledge base comprising a first set of documents and a second set of documents based on a term frequency inverse document frequency similarity metric to identify documents from the second set that are similar to a portion of the textual description that has been input, wherein documents of the first set comprise predetermined links to documents of the second set;
displaying one or more of the second set of the documents that are identified as being similar to the amount textual description based on the search in a UI field of the UI; and
performing, after additional textual description has been input, a refined search on the knowledge base to identify documents that are similar to the textual description that has been input based on the document similarity metric, wherein,
the displaying is updated to display one or more documents identified as being similar to the textual description based on the refined search,
the first set of documents correspond to support questions, and the second set of documents correspond to support answers, the support questions having predetermined support answers, and
when a subset of the support answers does not include a support answer whose document similarity with the textual description according to the document similarity metric is greater than a threshold, the refined search is further performed on the knowledge base based on document similarity according to the document similarity metric to identify a subset of the support questions that are similar to the textual description.

10. The method of claim 9, wherein the one or more UI fields include one or more of a mailing list field, a subject field, and a description field.

11. The method of claim 10, wherein the search is performed by constructing a query document that includes all words in a subject input in the subject field and a description input in the description field.

12. The method of claim 11, wherein the documents are identified based on the document similarity metric determined for the query document relative to the documents of the knowledge base.

13. The method of claim 11, wherein the knowledge base corresponds to a customer support system.

14. The method of claim 13, wherein the search is performed on the second set of documents based on the document similarity metric to identify a subset of the support answers that are similar to the query document.

15. The method of claim 14,
wherein, when the subset of the support answers does not include a support answer whose document similarity with the query document according to the document similarity metric is greater than a threshold, the refined search is further performed on the knowledge base based on document similarity according to the document similarity metric to identify a subset of the support questions that are similar to the subject input in the subject field;
wherein the one or more of the documents that are displayed in the UI field comprise one or more previously identified answers to the subset of the support questions.

16. The method of claim 13, wherein, for a given term of the query document and a given document in the second set of documents of the knowledge base, the similarity metric increases proportionally to a number of times the given term appears in the given document and is offset by an overall frequency of the given term in documents of the second set of documents.

17. A system for search and retrieval, comprising:
a processor; and
a memory coupled to the processor and including modules that, when executed by the processor:
monitor one or more user interface (UI) fields configured to receive text input in a UI;
determine that the one or more UI fields are being used to input a textual description;
perform, after an amount of textual description greater than a threshold has been input, a search on a knowledge base comprising a first set of documents and a second set of documents based on a term frequency inverse document frequency similarity metric to identify documents from the second set that are similar to a portion of the textual description that has been input, wherein documents of the first set comprise predetermined links to documents of the second set;
display one or more of the second set documents that are identified as being similar to the amount textual description based on the search in a UI field of the UI; and
perform, after additional textual description has been input, a refined search on the knowledge base to identify documents that are similar to the textual description that has been input based on the document similarity metric, wherein, the displaying is updated to display one or more documents identified as being similar to the textual description based on the refined search the first set of documents correspond to support questions, and the second set of documents correspond to support answers, the support questions having predetermined support answers, and when a subset of the support answers does not include a support answer whose document similarity with the textual description according to the document similarity metric is greater than a threshold, the refined search is further performed on the knowledge base based on document similarity according to the document similarity metric to identify a subset of the support questions that are similar to the textual description.

18. The system of claim 17, wherein the one or more UI fields include one or more of a mailing list field, a subject field, and a description field.

* * * * *

UNITED STATES PATENT AND TRADEMARK OFFICE
CERTIFICATE OF CORRECTION

PATENT NO. : 10,332,123 B2  
APPLICATION NO. : 14/837249  
DATED : June 25, 2019  
INVENTOR(S) : Alexander et al.

Page 1 of 1

It is certified that error appears in the above-identified patent and that said Letters Patent is hereby corrected as shown below:

On the Title Page

On page 2, Column 2, under Other Publications, Line 20, delete "203860418-" and insert -- 203660416- --, therefor.

In the Drawings

On sheet 1 of 5, in Fig. 1, under Reference Numeral 16, Line 1, delete "Retreival" and insert -- Retrieval --, therefor.

In the Specification

In Column 1, Line 44, after "providing" insert -- . --.

Signed and Sealed this  
Twenty-first Day of July, 2020

Andrei Iancu  
*Director of the United States Patent and Trademark Office*